Feb. 11, 1936.   F. J. PEASE   2,030,651
STORAGE BATTERY CHARGE INDICATOR
Filed Dec. 22, 1930
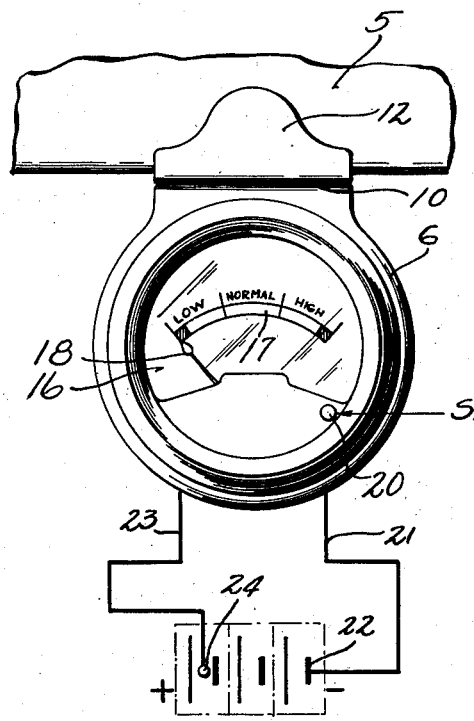
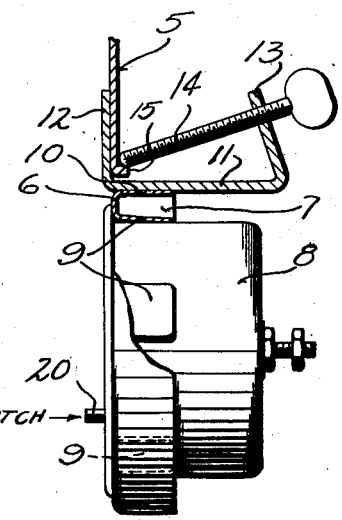
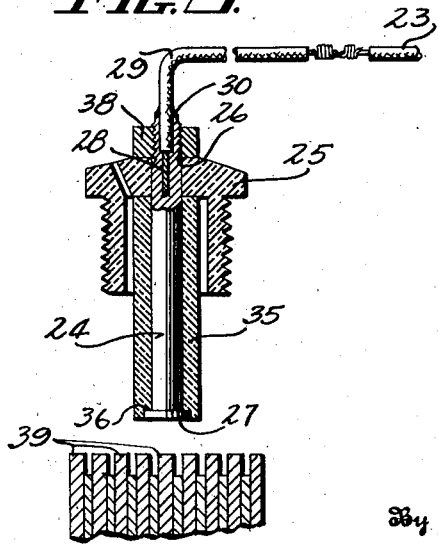
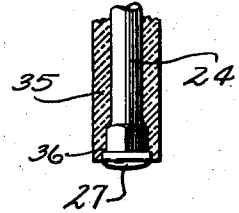
Inventor
Frederick J. Pease
By Wheeler, Wheeler & Wheeler
Attorneys Patented Feb. 11, 1936

2,030,651

UNITED STATES PATENT OFFICE

2,030,651

STORAGE BATTERY CHARGE INDICATOR

Frederick J. Pease, Wauwatosa, Wis., assignor to Clum Manufacturing Company, Milwaukee, Wis., a corporation of Wisconsin Application December 22, 1930, Serial No. 503,963

3 Claims. (Cl. 136—182)

This invention relates to improvements in storage battery charge indicators. The indicator herein disclosed may also be used to detect charges in factors indicative of the condition of other cells.

It is the primary purpose of this invention to provide a special electrode for storage batteries which may be incorporated in the closure plug of one cell of a multi-cell battery and so connected with a special indicating instrument as to show the state of charge of said battery through the use of current developed in the remaining cells.

It is one of the objects of this invention to provide an instrument which, because of its windings and circuit and the nature of the special electrode used in said circuit, is of sufficiently inexpensive and rugged construction to be practicable in the automotive field, while adapted for many other fields of use. In carrying out this object of the invention, the use of a voltmeter capable of indicating accurately the variation in voltage across the extreme terminals of the battery is avoided because such a meter is too expensive and delicate for the purposes in mind.

It is also a very important object of this invention to provide a device which will show accurately the effective state of charge of the cell under test, eliminating, so far as possible, such variable factors as have heretofore been involved in battery meters and are attributable to variation in depth of electrolyte, corrosion of the terminals, and variations in the condition of the plates making up the battery. The present device does not indicate depth of electrolyte at all except insofar as it may be rendered inoperative when the depth of electrolyte in the cell containing the special electrode falls so low that the electrolyte does not make contact with said electrode.

The device of the present invention is intended to respond, and does respond, to changes of resistance both in the cell furnishing the electromotive force and in the cell in which the special electrode is placed.

So far as my improved device and circuit are concerned, the cell in which my special electrode is placed ordinarily furnishes no current to the instrument. Its resistance, however, supplements the effect of voltage variation in the other cells to control the deflection of the instrument. In effect, the resistance of the third cell is used as a variable multiplying voltage external to the cells which furnish energy to the instrument, and supplementing the internal resistance of the last mentioned cells as an index showing the state of charge of the battery as a whole, independently of other factors. A given cross section of the electrolyte affords, under stated conditions, a given amount of resistance. By limiting the exposed area of my special electrode to a predetermined extent, irrespective of changes of level in the electrolyte, I am able to measure the resistance of the electrolyte with laboratory precision, and to increase the variable portion of the total resistance of the circuit to such a degree as to give a wide range of deflection of the indicating instrument indicative of the characteristics of the battery which, from a practical standpoint, show its useful charge.

Whereas a specific gravity test will accurately reflect the useful charge of the battery under normal summer temperature conditions, such a test may prove misleading in cold weather, since the cold has an effect equivalent to reducing the battery capacity. I have found, however, that through the use of the present invention, I obtain at all times a true indication of the effective charge. That is to say, the meter used in the circuit herein disclosed will decrease its reading in proportion to decreases in temperature, even though the specific gravity of the electrolyte remains constant. Thus, the operator is warned that his battery is becoming less effective at low temperatures and that to maintain its useful charge he is obliged to increase his charging rate. Obviously, this result depends upon the use, as herein disclosed, of a circuit affected largely by variations in the voltage of the cells furnishing current and also in resistance of the electrolyte and also upon an electrode so designed that the area exposed to the electrolyte will remain reasonably constant irrespective of changes of level of the electrolyte.

More specifically stated, therefore, the purposes of the invention include the provision of a special electrode having a limited area of substantially no vertical extent, the provision of a special circuit including such an electrode and enabling it to function in accordance with the purposes of this invention; the provision of a low resistance meter which may be supplemented by the resistance of the cell containing the special electrode; and the provision of special means enabling the device to be used in connection with existing motor vehicles as well as those in which it may be incorporated in factory production.

Other objects will be apparent from the description of the various features of the device and their functions.

In the drawing:

Figure 1 is a front elevation of an instrument and a mounting bracket therefor, together with a diagrammatic illustration of the circuit in which such instrument is connected.

Figure 2 is a side elevation of the instrument and its mounting, a portion of the mounting bracket being broken away to a section exposing its mechanical construction.

Figure 3 is an enlarged detail view in section, of a preferred form of electrode to be incorporated in the cell of the battery which affects the meter operation, the relation of the special electrode to the battery plates being indicated by a fragmentary illustration of the plates in section.

Figure 4 is a fragmentary detail of a modified form of electrode which will also give good results in the circuit shown in Fig. 1.

Like parts are identified by the same reference characters throughout the several views.

The application of the indicating instrument to the panel or instrument board specially designed therefor, will be a matter of choice, but to enable the device to be mounted upon an instrument panel 5 which has no special provision therefor, there is provided a special bracket 6 comprising a cup-shaped member 7 having a central opening through which the meter case 8 is receivable. Around the margin of the opening are a number of centrally inclined yieldable fingers 9 which rigidly engage an instrument case thrust therein.

The upper part of the cup-shaped member 7 is formed horizontally, as shown at 10, and is welded or otherwise anchored to a clamp member 11, one leg of which comprises an ornamental plate 12 for engagement with the front of the instrument panel 5, and the other leg 13 of which is inclined toward leg 12 so that the clamp screw 14 will operate downwardly as well as rearwardly against the panel in engagement with the flange 15 at the lower margin thereof.

The instrument preferably includes a dial 16 having a calibrated scale at 17 bearing suitable indications as to the relative state of the battery. The extreme ends of the scale indicative of over or under charge, are preferably colored red. In the particular type of instrument shown, the dial 16 is stationary and a pointer at 18 moves across the calibrated scale when it is electromagnetically energized by the flow of current through the circuit hereinafter to be described. The instrument preferably includes a normally open switch, of which the button is shown at 20.

The instrument described is of standard construction with the exception of the electrical winding which is preferably designed to afford very little resistance as compared with other meters usually employed in battery testing circuits. It is because of this very low meter resistance that the switch is desirable, so that the circuit is normally open to avoid draining the battery. It is only by pressing button 20, thereby momentarily closing the circuit, that the pointer 18 is made to indicate battery condition.

The negative terminal of the instrument is connected directly by lead 21 with the negative plate 22 of the first battery cell. The second lead 23 connects the instrument with the special electrode 24 preferably incorporated in the last cell of the battery in spaced relation to the plates thereof. The arrangement is such that the energy of the cell in which electrode 24 is placed does not act upon the instrument.

The special electrode 24 is preferably mounted, or adapted to be mounted, in a closure cap 25 of a standard storage battery style, without interference with the vent usually provided in such caps. For this purpose the electrode 24 may comprise a rod, screw threaded at 26, and provided with a head 27 and a conductor 28 which is preferably fused to rod 24, avoiding necessity for the use of corrodable terminals. As a further precaution against corrosion, it is preferred that the conductor 28 have a rubber cover 29 extending well into the end of the electrode post 24. This may conveniently be done at the time the post is cast on to the end of conductor 28. If any crevice remains through which acid fumes might enter in a way to cause corrosion, the parts may be covered at 30 with an acid proof paint or sealing wax or some like protective coating.

If, as is ordinarily the case, it is undesirable to use the special electrode as a means of developing potential in the cell under test, such electrode should be of the same composition as the input electrode of such cell which, in ordinary battery practice, is ninety per cent lead and ten per cent antimony.

Except from the standpoint of convenience, there is no advantage in introducing the special electrode through the closure cap into the cell, and it will also be obvious that unless the special electrode enters the cell at a point where it passes downwardly across the surface level of the electrolyte, there is no advantage in dielectrically sheathing the electrode.

The electrode is positioned, as well as insulated, by means of a dielectric bushing 35 which covers the whole length of the electrode except the outer face of its head portion 27. The bushing is preferably recessed at 36 to receive the head 27, leaving only the lower face thereof exposed. The lower face is preferably flush with the end of the bushing, but in order to avoid the possibility of gaseous accumulations on a horizontal surface, the head may be slightly convex as shown in Fig. 4, the object being to get it as nearly horizontal as is practical.

The electrode and its bushing are maintained in assembly with the filler cap 25 by means of a nut 38 threaded to the electrode and engaging the top of the cap. This nut is used to draw the parts tightly together and thereby to prevent the electrolyte from entering between the electrode and its insulating cushion.

Obviously, there would be no difference in principle if, instead of being made of a tube of bakelite or hard rubber, the bushing were cast of these materials, or of glass, or of any other suitable dielectric and acid-proof material directly upon the electrode.

The length of the bushing 35 and electrode 24 will be such to maintain the exposed face of the electrode in spaced relation to the battery plates 39, as shown in Fig. 3.

Heretofore the electrodes used in connection with battery indicators have been exposed throughout their length. To this fact is attributed the failure of previous battery indicators to indicate the state of charge of the battery. It is particularly important in the circuit illustrated, and in conjunction with the type of indicating instrument above described, that the area of the special electrode which is exposed to the electrolyte should remain as nearly as possible a constant factor. It cannot be constant where the exposed area depends upon the degree to which the electrode is immersed in the electrolyte. Hence, it is an important feature of the present invention that the electrode used is such that its exposed surface is substantially unaffected by changes of electrolyte level. In the particular device disclosed, this is ensured by sheathing the portion of the special electrode which passes through the surface of the electrolyte and disposing the exposed area substantially entirely at one level.

The sheathing performs two functions consisting first, in eliminating the effect of change of level of the electrolyte and thereby keeping constant the exposed area of the special electrode; and secondly, in predetermining said area. If the electrode does not cross the surface of the electrolyte the first necessity for use of sheathing is eliminated, and the second desirable factor may be achieved otherwise by restricting the overall dimension of the portion of the special electrode within the cell.

The voltage of a storage battery is known to vary with the charge. In the ordinary battery the variation between full charge and discharge may be as much as one half volt per cell. In the circuit herein disclosed there is, therefore, a substantial variation in voltage in the two cells which are furnishing the current. As above pointed out, however, an instrument capable of showing this voltage with reasonable accuracy would have to be a rather delicate and expensive instrument and would, moreover, only show the voltage instead of the effective charge of the battery as determined by temperature as well as voltage.

In my improved circuit the reading of the meter is partially attributable to the change of voltage in the cells furnishing the current (assuming that the current is derived from one or more cells of the battery under test), but a factor in the deflection of the needle of the instrument is achieved by reason of the variation of resistance of the electrolyte in the cell which is used as an index to the condition of the battery by insertion of the special electrode therein.

The exposed area of electrode 24 bears a very important relation to the characteristics of the indicating instrument. In order to obtain maximum deflection the resistance of the instrument and the external circuit in which it is incorporated should be low. A meter having a resistance of 1.1 ohms has been found satisfactory.

The electrolytic resistance of the cells furnishing the potential would of course vary in accordance with the charge of these cells, but this variation is negligible because of the enormous area of the plates in the ordinary battery. For example, a change in specific gravity from 1.28 to 1.1 would increase the resistance of one cubic inch of electrolyte by only one tenth of an ohm. The storage battery is designed to provide large plate area whereby the variation in resistance is decreased almost to the vanishing point.

The advantage of limiting the area of the special electrode used in the shunt circuit herein disclosed, is that by means of this limited area the area for transmission of current through the electrolyte is correspondingly reduced and may, for example, be of the order of one tenth of a square inch. With the variable factor so increased in resistance, the change of resistance noted between specific gravities of 1.28 and 1.1 in the electrolyte may represent a change from 1.6 ohms to 2.8 ohms. As compared with the low meter resistance of 1.1 ohms, this amount of variation in the electrolyte resistance is obviously capable of producing a great change in rate of current flow through the circuit, and a correspondingly great meter deflection.

In practice the current flowing through the instrument under the circumstances stated will vary from 1.55 amperes to 2 amperes. A change in the resistance of the indicating instrument would necessitate a corresponding change in the exposed area of the special electrode. Thus, the special electrode can be used as a means of adapting the circuit to many desired types and forms of indicating instruments.

I claim:

1. An electrolytic resistance test circuit comprising the combination with a body of electrolyte to be tested, of a source of potential, an indicating instrument comprising a resistance a dial and a pointer affected by current passing said resistance, an electrode, and a circuit connecting said electrolyte said source of potential and said instrument together in series, said electrode being immersed in the electrolyte and having exposed thereto a surface of predetermined area substantially constant irrespective of normal fluctuation of electrolyte level, said area being so small in proportion to the resistance of a unit mass of electrolyte, and the resistance of the instrument and the circuit being so low that the electrolytic resistance of the electrolyte to which said electrode area is exposed is in excess of the resistance of said instrument and circuit.

2. A device of the character described comprising a plurality of electrolytic cells in series and provided with electrodes, an ammeter provided with a normally open switch, and an auxiliary electrode in a final cell of said series and of substantially the same material as the negative electrode of said final cell, each cell of said series other than said final cell being connected in normally open circuit through said switch with said ammeter and said auxiliary electrode and the electrolyte of said final cell, the area of said auxiliary electrode exposed to the electrolyte of said final cell being substantially constant irrespective of normal fluctuation of electrolyte level, and so determined with reference to resistance of said ammeter that the resistance of the electrolyte of the final cell in the circuit exceeds the resistance of the remaining external circuit including the ammeter.

3. A circuit comprising the electrodes of one battery cell, the electrolyte of a second battery cell, an auxiliary electrode in said second battery cell and a low resistance electromagnetic indicating instrument, said electrode having a substantially constant exposed area such that the electrical resistance of the electrolyte to which said area is exposed is at least as great as that of all of the remainder of the circuit including the resistance of said instrument.

FREDERICK J. PEASE.